(12) United States Patent
Hamachi et al.

(10) Patent No.: US 10,333,161 B2
(45) Date of Patent: Jun. 25, 2019

(54) LOW-TEMPERATURE STARTUP METHOD FOR FUEL CELL SYSTEM

(71) Applicant: HONDA MOTOR CO., LTD., Tokyo (JP)

(72) Inventors: Masakazu Hamachi, Wako (JP); Hiroaki Ota, Wako (JP); Shinya Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 15 days.

(21) Appl. No.: 15/434,059

(22) Filed: Feb. 16, 2017

(65) Prior Publication Data

US 2017/0244122 A1 Aug. 24, 2017

(30) Foreign Application Priority Data

Feb. 23, 2016 (JP) ................................. 2016-031653

(51) Int. Cl.
| | |
|---|---|
| *H01M 8/04* | (2016.01) |
| *H01M 8/04302* | (2016.01) |
| *H01M 8/04746* | (2016.01) |
| *H01M 8/04992* | (2016.01) |
| *H01M 8/04828* | (2016.01) |
| *H01M 8/0432* | (2016.01) |
| *H01M 8/1018* | (2016.01) |

(52) U.S. Cl.
CPC ..... *H01M 8/04302* (2016.02); *H01M 8/0432* (2013.01); *H01M 8/04753* (2013.01); *H01M 8/04768* (2013.01); *H01M 8/04828* (2013.01); *H01M 8/04992* (2013.01); *H01M 2008/1095* (2013.01); *H01M 2250/20* (2013.01); *Y02T 90/32* (2013.01)

(58) Field of Classification Search
CPC ...... H01M 8/02; H01M 8/04; H01M 8/04302; H01M 8/04746; H01M 8/04992
See application file for complete search history.

(56) References Cited

U.S. PATENT DOCUMENTS

| | | | |
|---|---|---|---|
| 2004/0058230 A1* | 3/2004 | Hsu ........................ | B01J 19/249 429/62 |
| 2006/0074574 A1* | 4/2006 | Gasda ............... | H01M 8/04559 702/63 |

(Continued)

FOREIGN PATENT DOCUMENTS

| | | |
|---|---|---|
| JP | 07-235324 | 9/1995 |
| JP | 2007-188830 | 7/2007 |

(Continued)

OTHER PUBLICATIONS

Japanese Office Action for corresponding JP Application No. 2016-031653, dated Aug. 29, 2017 (w/ English machine translation).

*Primary Examiner* — Kenneth J Douyette
(74) *Attorney, Agent, or Firm* — Mori & Ward, LLP

(57) ABSTRACT

A low-temperature startup method for a fuel cell, includes detecting a temperature of the fuel cell. It is determined whether the temperature is lower than a threshold temperature. A drying operation to dry the fuel cell is increased when the temperature is determined to be lower than the threshold temperature upon starting the fuel cell to generate electric power via an electrochemical reaction between fuel gas and oxidant gas.

5 Claims, 3 Drawing Sheets

(56) References Cited

U.S. PATENT DOCUMENTS

2007/0166577 A1* 7/2007 Inai .................. H01M 8/04007
                                                          429/413
2010/0291446 A1* 11/2010 Aso .................... B60L 11/1887
                                                          429/429

FOREIGN PATENT DOCUMENTS

JP          2007-242449          9/2007
JP          2013-239290          11/2013

* cited by examiner

LOW-TEMPERATURE STARTUP METHOD FOR FUEL CELL SYSTEM

CROSS-REFERENCE TO RELATED APPLICATIONS

The present application claims priority under 35 U.S.C. § 119 to Japanese Patent Application No. 2016-031653, filed Feb. 23, 2016, entitled "Low-Temperature Startup Method In Fuel Cell System." The contents of this application are incorporated herein by reference in their entirety.

BACKGROUND

1. Field

The present disclosure relates to a low-temperature startup method in a fuel cell system.

2. Description of the Related Art

For example, a solid polymer electrolyte fuel cell includes a membrane electrode assembly (MEA) in which an anode electrode is disposed at one surface of an electrolyte membrane made of a polymer ion exchange membrane and a cathode electrode is disposed at the other surface of the electrolyte membrane, respectively. The membrane electrode assembly is sandwiched between separators to constitute a power generation cell (unit cell). Usually, a predetermined number of power generation cells are stacked successively to constitute, e.g., a vehicle-mounted fuel cell stack that is installed in a fuel cell vehicle (such as a fuel cell electric car).

In the above-mentioned type of fuel cell, because power generation (operation) is performed by electrochemical reaction between hydrogen gas (fuel gas) and oxygen gas (oxidant gas), water produced with the reaction generates in the cathode side. On the other hand, the produced water passes through an electrolyte membrane (by back diffusion) and moisture is present in the anode side. Although the electrolyte membrane is needed to be kept in a desired wet state, stagnant water may impede flows of the reaction gases. In view of the above point, various techniques are proposed to purge the excessive water.

For example, Japanese Unexamined Patent Application Publication No. 07-235324 discloses a driving device for a fuel cell, which is intended to continuously and efficiently obtain electromotive force by purging produced water near an electrode with quick response. In the disclosed driving device, excessive wetting of a cathode surface of the fuel cell is sensed from both an output voltage detected by a voltmeter and an impedance detected by an impedance meter. When the excessive wetting of the cathode surface is sensed, the driving device executes control to increase an opening degree of an electric-operated valve that is disposed in a bypass line.

With the above control, a flow rate through the bypass line is increased, and a flow rate of oxygen gas supplied to the cathode side of the fuel cell is increased. Therefore, water droplets condensed at and adhering to the cathode surface are blown off by dynamic pressure of the oxygen gas. As a result, according to the disclosure, fine pores in the cathode surface can be prevented from being closed by the water droplets.

SUMMARY

According to one aspect of the present invention, a low-temperature startup method for a fuel cell, includes detecting a temperature of the fuel cell. It is determined whether the temperature is lower than a threshold temperature. A drying operation to dry the fuel cell is increased when the temperature is determined to be lower than the threshold temperature upon starting the fuel cell to generate electric power via an electrochemical reaction between fuel gas and oxidant gas.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
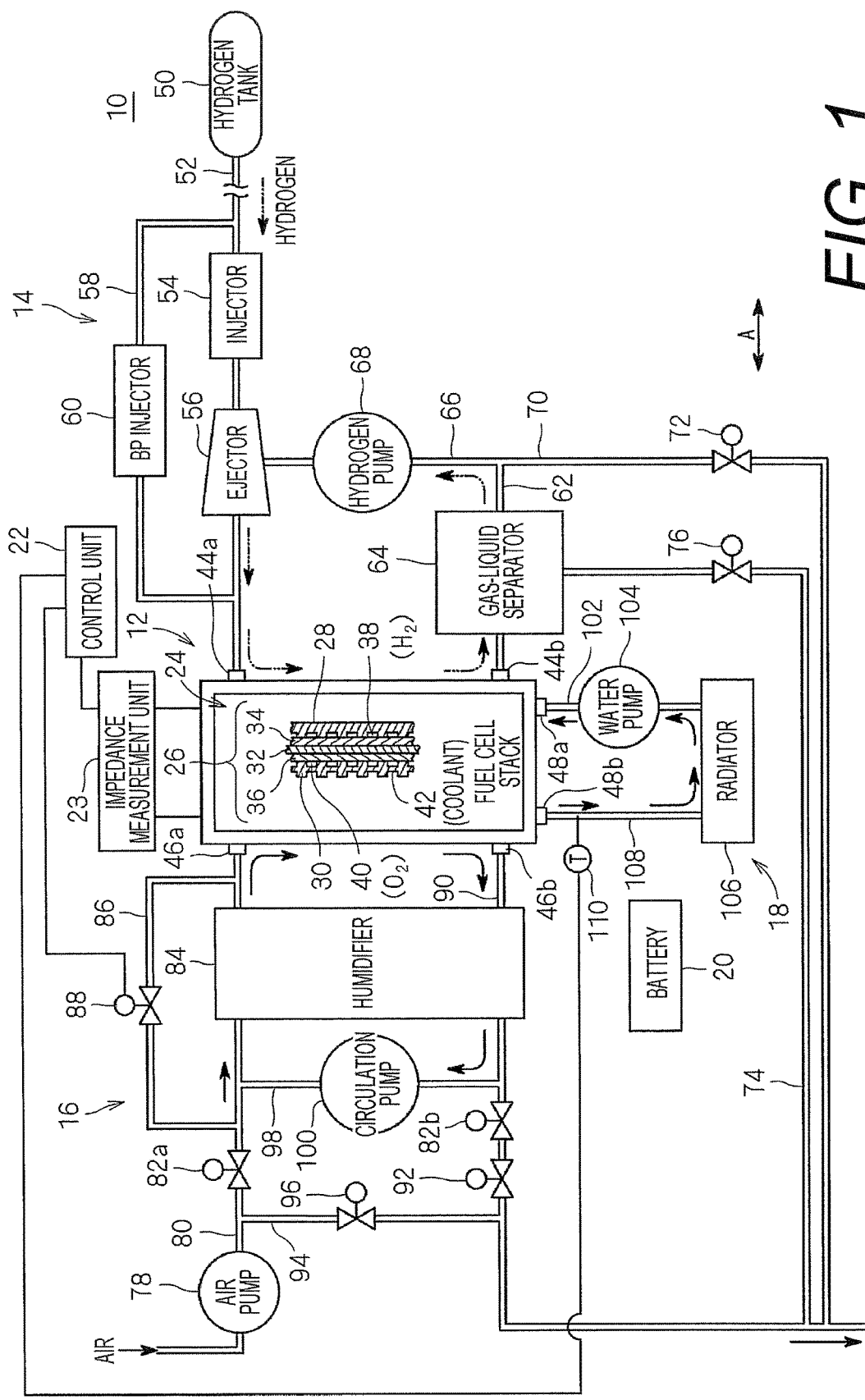
FIG. 1 is a schematic explanatory view of a fuel cell system to which a low-temperature startup method according to an embodiment of the present application is applied.

The embodiments will now be described with reference to the accompanying drawings, wherein like reference numerals designate corresponding or identical elements throughout the various drawings.

As illustrated in FIG. 1, a fuel cell system 10 to which a low-temperature startup method according to an embodiment of the present application is installed in a fuel cell vehicle (not illustrated), such as a fuel cell electric car.

The fuel cell system 10 includes a fuel cell stack 12. The fuel cell stack 12 is connected with a fuel gas supply device 14 that supplies, for example, hydrogen gas as fuel gas, an oxidant gas supply device 16 that supplies, for example, air as oxidant gas, and a coolant supply device 18 that supplies a coolant.

The fuel cell system 10 further includes a battery 20 that is an energy storage device, a control unit (ECU=electric control unit) 22 that is a system controller, and an impedance measurement unit 23. The impedance measurement unit 23 estimates a humidity or a resistance on the basis of an impedance value that is measured from a membrane electrode assembly 26 (described later), and the control unit 22 measures a water content of the membrane electrode assembly 26 on the basis of the estimated value.

The fuel cell stack 12 includes a plurality of power generation cells 24 stacked successively in a horizontal direction or a vertical direction. Each of the power generation cells 24 includes the membrane electrode assembly 26 sandwiched between a first separator 28 and a second separator 30. The first separator 28 and the second separator 30 are each constituted by a metal separator or a carbon separator.

The membrane electrode assembly 26 includes a solid polymer electrolyte membrane 32 that is, for example, a thin film made of a perfluorosulfonic acid and containing moisture, an anode electrode 34, and a cathode electrode 36, both the electrodes 34 and 36 sandwiching the solid polymer electrolyte membrane 32 therebetween. The solid polymer electrolyte membrane 32 may be made of a fluorine-based electrolyte or a HC (hydrocarbon)-based electrolyte.

The first separator 28 provides, between itself and the membrane electrode assembly 26, a hydrogen gas flow passage 38 through which hydrogen gas is supplied to the anode electrode 34. The second separator 30 provides, between itself and the membrane electrode assembly 26, an air flow passage 40 through which air is supplied to the cathode electrode 36. A coolant flow passage 42 allowing a coolant to flow therethrough is disposed between the first separator 28 and the second separator 30 adjacent to each other.

The fuel cell stack 12 has a hydrogen gas inlet 44a, a hydrogen gas outlet 44b, an air inlet 46a, an air outlet 46b, a coolant inlet 48a, and a coolant outlet 48b. The hydrogen gas inlet 44a penetrates through each power generation cell 24 in the stacking direction, and it is communicated with the supply side of the hydrogen gas flow passage 38. The hydrogen gas outlet 44b penetrates through each power generation cell 24 in the stacking direction, and it is communicated with the discharge side of the hydrogen gas flow passage 38. An anode flow passage is constituted by the hydrogen gas flow passage 38, the hydrogen gas inlet 44a, and the hydrogen gas outlet 44b.

The air inlet 46a penetrates through each power generation cell 24 in the stacking direction, and it is communicated with the supply side of the air flow passage 40. The air outlet 46b penetrates through each power generation cell 24 in the stacking direction, and it is communicated with the discharge side of the air flow passage 40. A cathode flow passage is constituted by the air flow passage 40, the air inlet 46a, and the air outlet 46b.

The coolant inlet 48a penetrates through each power generation cell 24 in the stacking direction, and it is communicated with the supply side of the coolant flow passage 42. The coolant outlet 48b penetrates through each power generation cell 24 in the stacking direction, and it is communicated with the discharge side of the coolant flow passage 42.

The fuel gas supply device 14 includes a hydrogen tank 50 that stores hydrogen under high pressure. The hydrogen tank 50 is communicated with the hydrogen gas inlet 44a of the fuel cell stack 12 through a hydrogen gas supply passage 52. The hydrogen gas supply passage 52 supplies the hydrogen gas to the fuel cell stack 12.

An injector 54 and an ejector 56 are disposed in the hydrogen gas supply passage 52 in series. Furthermore, a bypass supply passage 58 is connected to the hydrogen gas supply passage 52 in a bypassing relation to both the injector 54 and the ejector 56. A BP (bypass) injector 60 is disposed in the bypass supply passage 58. The BP injector 60 serves as a sub-injector that is used to supply a high concentration of hydrogen, for example, at startup of the fuel cell stack 12 or in response to a demand for high-load continuous power generation. On the other hand, the injector 54 serves as a main injector that is mainly used during ordinary power generation.

A hydrogen gas discharge passage (off-gas line) 62 is communicated with the hydrogen gas outlet 44b of the fuel cell stack 12. The hydrogen gas discharge passage 62 guides waste hydrogen gas, at least a part of which has been used by the anode electrode 34, to be discharged from the fuel cell stack 12. A gas-liquid separator 64 is connected to the hydrogen gas discharge passage 62. The ejector 56 is also connected to the hydrogen gas discharge passage 62 through a hydrogen circulation flow passage 66 that is branched from the hydrogen gas discharge passage 62 at a position downstream of the gas-liquid separator 64. A hydrogen pump 68 is disposed in the hydrogen circulation flow passage 66. At the startup, particularly, the hydrogen gas pump 68 circulates the waste hydrogen gas, which has been discharged to the hydrogen gas discharge passage 62, to the hydrogen gas supply passage 52 through the hydrogen circulation flow passage 66.

One end of a purge flow passage 70 is communicated with the downstream side of the hydrogen gas discharge passage 62, and a purge valve 72 is disposed midway the purge flow passage 70. One end of a waste water flow passage 74 through which a fluid mainly containing liquid components is discharged is connected to a bottom portion of the gas-liquid separator 64. A drain valve 76 is disposed midway the waste water flow passage 74.

The oxidant gas supply device 16 includes an air pump 78 that compresses air taken from the atmosphere and that supplies the compressed air. The air pump 78 is disposed in an air supply passage 80. The air supply passage 80 supplies the air to the fuel cell stack 12.

In the air supply passage 80, a supply-side on-off valve (inlet sealing valve) 82a and a humidifier 84 are disposed downstream of the air pump 78. The air supply passage 80 is communicated with the air inlet 46a of the fuel cell stack 12. A bypass supply passage 86 is connected to the air supply passage 80 in a bypassing relation to the humidifier 84. A BP flow rate adjustment valve 88 (bypass valve) is disposed in the bypass supply passage 86 to adjust a flow rate of air flowing through the bypass supply passage 86.

An air discharge passage 90 is communicated with the air outlet 46b of the fuel cell stack 12. The humidifier 84 for exchanging moisture and heat between the supplied air and the discharged air, a discharge-side on-off valve (outlet sealing valve) 82b, and a back pressure valve 92 are disposed in the air discharge passage 90. The air discharge passage 90 discharges, from the fuel cell stack 12, waste air at least a part of which has been used by the cathode electrode 36. The other end of the purge flow passage 70 and the other end of the waste water flow passage 74 are connected to the downstream side of the air discharge passage 90, thus constituting a dilution section.

Opposite ends of a bypass flow passage 94 is communicated with the air supply passage 80 and the air discharge passage 90 at positions upstream of the supply-side on-off valve 82a and downstream of both the discharge-side on-off valve 82b and the back pressure valve 92, respectively. A BP flow rate adjustment valve 96 is disposed in the bypass flow passage 94 to adjust a flow rate of air flowing through the bypass flow passage 94. An air circulation flow passage 98 is communicated with the air supply passage 80 and the air discharge passage 90 at positions downstream of the supply-side on-off valve 82a and upstream of the discharge-side on-off valve 82b, respectively. A circulation pump 100 is disposed in the air circulation flow passage 98. The circulation pump 100 circulates the waste air, which has been discharged to the air discharge passage 90, to the air supply passage 80 through the air circulation flow passage 98.

The coolant supply device 18 includes a coolant supply passage 102 that is connected to the coolant inlet 48a of the fuel cell stack 12. A water pump 104 is disposed midway the coolant supply passage 102. The coolant supply passage 102 is connected to a radiator 106, and a coolant discharge passage 108 in communication with the coolant outlet 48b is also connected to the radiator 106. A temperature sensor 110 for detecting a temperature at the coolant outlet is disposed in the coolant discharge passage 108.

The operation of the fuel cell system 10 thus constituted will be described below.

In the fuel gas supply device 14, the hydrogen gas is supplied from the hydrogen tank 50 to the hydrogen gas supply passage 52. The hydrogen gas is then supplied to the hydrogen gas inlet 44a of the fuel cell stack 12 through both the injector 54 and the ejector 56. The hydrogen gas is introduced to the hydrogen gas flow passage 38 from the hydrogen gas inlet 44a, and is supplied to the anode electrode 34 of the membrane electrode assembly 26 in the course of moving along the hydrogen gas flow passage 38.

In the oxidant gas supply device 16, air is delivered to the air supply passage 80 with rotation of the air pump 78. The air is humidified while passing through the humidifier 84, and is then supplied to the air inlet 46a of the fuel cell stack 12. Furthermore, the air is introduced to the air flow passage 40 from the air inlet 46a, and is supplied to the cathode electrode 36 of the membrane electrode assembly 26 in the course of moving along the air flow passage 40.

Thus, in the membrane electrode assembly 26, the hydrogen gas supplied to the anode electrode 34 and oxygen in the air supplied to the cathode electrode 36 are consumed by the electrochemical reaction in catalyst layers of the electrodes, whereby electric power is generated.

In the coolant supply device 18, a coolant, e.g., pure water, ethylene glycol, or oil, is supplied to the coolant inlet 48a of the fuel cell stack 12 from the coolant supply passage 102 by the action of the water pump 104. After flowing along the coolant flow passage 42 to cool the power generation cells 24, the coolant is discharged to the coolant discharge passage 108 through the coolant outlet 48b.

The hydrogen gas having been supplied to the anode electrode 34 and having been partly consumed by the anode electrode 34 (i.e., the waste hydrogen gas) is discharged to the hydrogen gas discharge passage 62 through the hydrogen gas outlet 44b. The waste hydrogen gas is introduced to the hydrogen circulation flow passage 66 from the hydrogen gas discharge passage 62, and is circulated to the hydrogen gas supply passage 52 by the sucking action of the ejector 56. The waste hydrogen gas discharged to the hydrogen gas discharge passage 62 is discharged (purged), as required, to the outside with opening of the purge valve 72.

Likewise, the air having been supplied to the cathode electrode 36 and having been partly consumed by the cathode electrode 36 (i.e., the waste air) is discharged to the air discharge passage 90 through the air outlet 46b. The waste air is passed through the humidifier 84 to humidify fresh air supplied from the air supply passage 80. After pressure of the waste air is adjusted to the setting pressure of the back pressure valve 92, the waste air is discharged to the dilution section. The air discharged to the air discharge passage 90 is circulated, as required, to the air supply passage 80 through the air circulation passage 80 by the action of the circulation pump 100.

The low-temperature startup method in the fuel cell system 10, according to an embodiment, will be described below with reference to a time chart illustrated in FIG. 2 and a flowchart illustrated in FIG. 3.

When an ignition switch (IG) is turned on in a low-temperature environment, e.g., an environment below freezing, a warm-up operation of the fuel cell system 10 is started. At that time, in the oxidant gas supply device 16, an opening degree of the BP flow rate adjustment valve 88 is set to a larger value regardless of the impedance value detected by the impedance measurement unit 23. Thus, even though it is determined from the result measured by the impedance measurement unit 23 that the membrane electrode assembly 26 is dry, the control unit 22 executes control (drying control) for reducing an amount of air supplied to the humidifier 84 such that dry air is supplied to the fuel cell stack 12.

Figure 3:
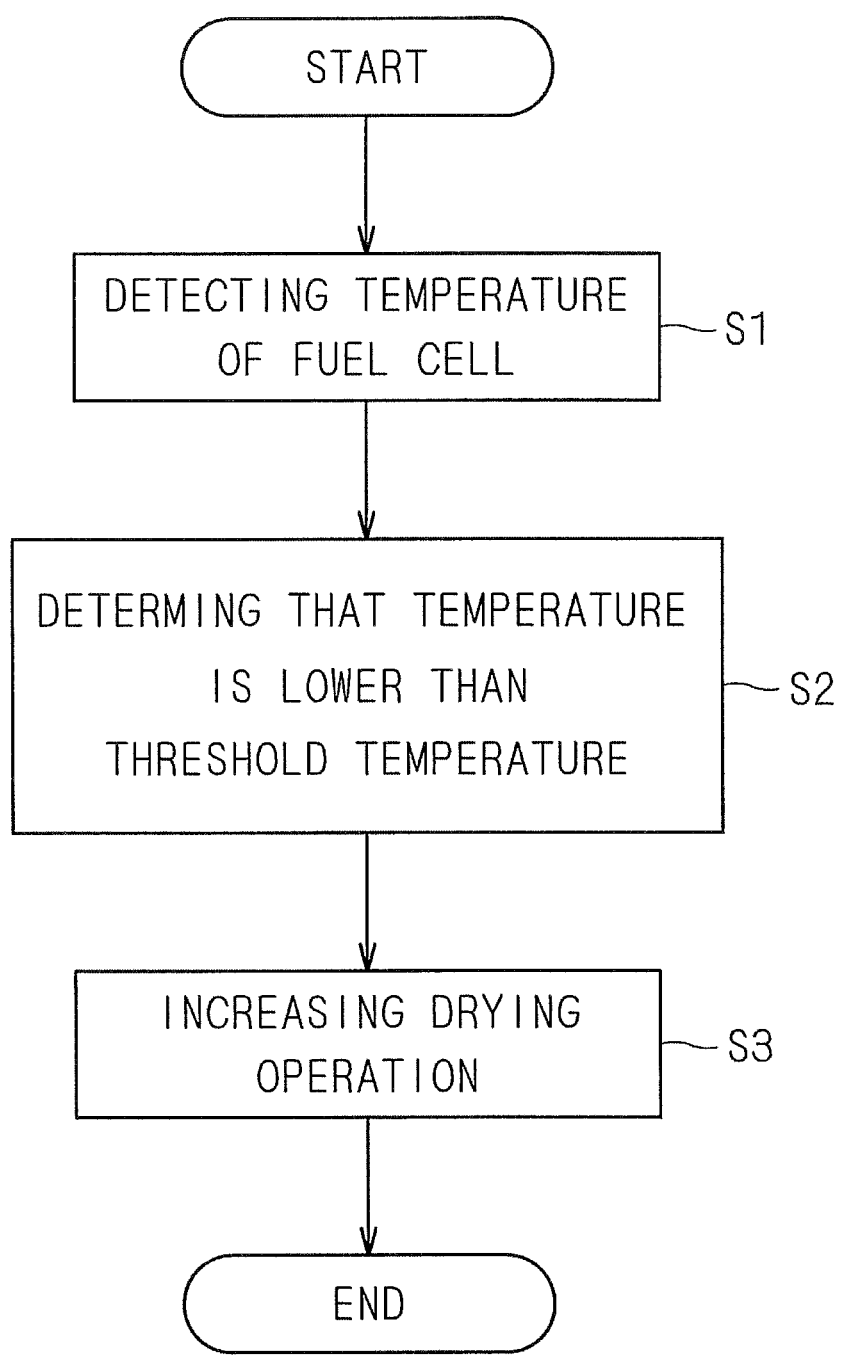
FIG. 3 is a flowchart to explain the low-temperature startup method.

In the coolant supply device 18, the temperature at the coolant outlet is detected by the temperature sensor 110 (step S1 in FIG. 3). As to the temperature at the coolant outlet, a specific temperature at which it can be determined that the temperature in the electrode surface exceeds 0° C. is previously set with, e.g., tests. For example, the correlation between the temperature at the coolant outlet and the temperature in the electrode surface in the case of quick acceleration is different from the correlation between the temperature at the coolant outlet and the temperature in the electrode surface in the case of idle power generation. Accordingly, the above determination temperature is set taking into account those correlations.

When it is determined from the result detected by the temperature sensor 110 that the temperature in the electrode surface exceeds 0° C., the control unit 22 executes feedback control. The control unit 22 monitors the impedance value measured by the impedance measurement unit 23 and the temperature at the coolant outlet detected by the temperature sensor 110 (i.e., the temperature in the electrode surface). Furthermore, the control unit 22 adjusts the opening degree of the BP flow rate adjustment valve 88 and prevents excessive drying in the membrane electrode assembly 26.

Then, when the measured impedance value increases to a lower limit of a control range of an IMP (impedance) target value (i.e., to a temperature Tw° C.), the control unit 22 operates the BP flow rate adjustment valve 88 in a direction to reduce the opening degree because the membrane electrode assembly 26 is shifted to a dry state. Thus, the air supplied to the fuel cell stack 12 is passed to the humidifier 84 in a larger amount to be humidified therein, whereby the excessive drying in the membrane electrode assembly 26 is prevented. Accordingly, the measured impedance value is held within the control range of the IMP target value.

Moreover, in the low-temperature startup, an IMP degradation-suppression upper limit value is set. The IMP degradation-suppression upper limit value is a threshold at which the excessive drying is determined. If the impedance value reaches the IMP degradation-suppression upper limit value, there would be a possibility that the solid polymer electrolyte membrane 32 is broken.

To avoid such a trouble, when the measured impedance value approaches the IMP degradation-suppression upper limit value, the control unit 22 shifts to feedback control and executes humidification control. As an alternative, the control unit 22 may adjust the opening degree of the BP flow rate adjustment valve 88 by monitoring the state of a cell voltage in the fuel cell stack 12, and by determining the dry state of the membrane electrode assembly 26.

In the embodiment, at the low-temperature startup (step S2 in FIG. 3), drying control to further promote drying in comparison with control executed at ordinary startup is executed for a predetermined time (step S3 in FIG. 3). More specifically, in the environment below freezing, the oxidant gas supply device 16 sets the opening degree of the BP flow rate adjustment valve 88 to a larger value regardless of the detected impedance value (see FIG. 2).

Figure 2:
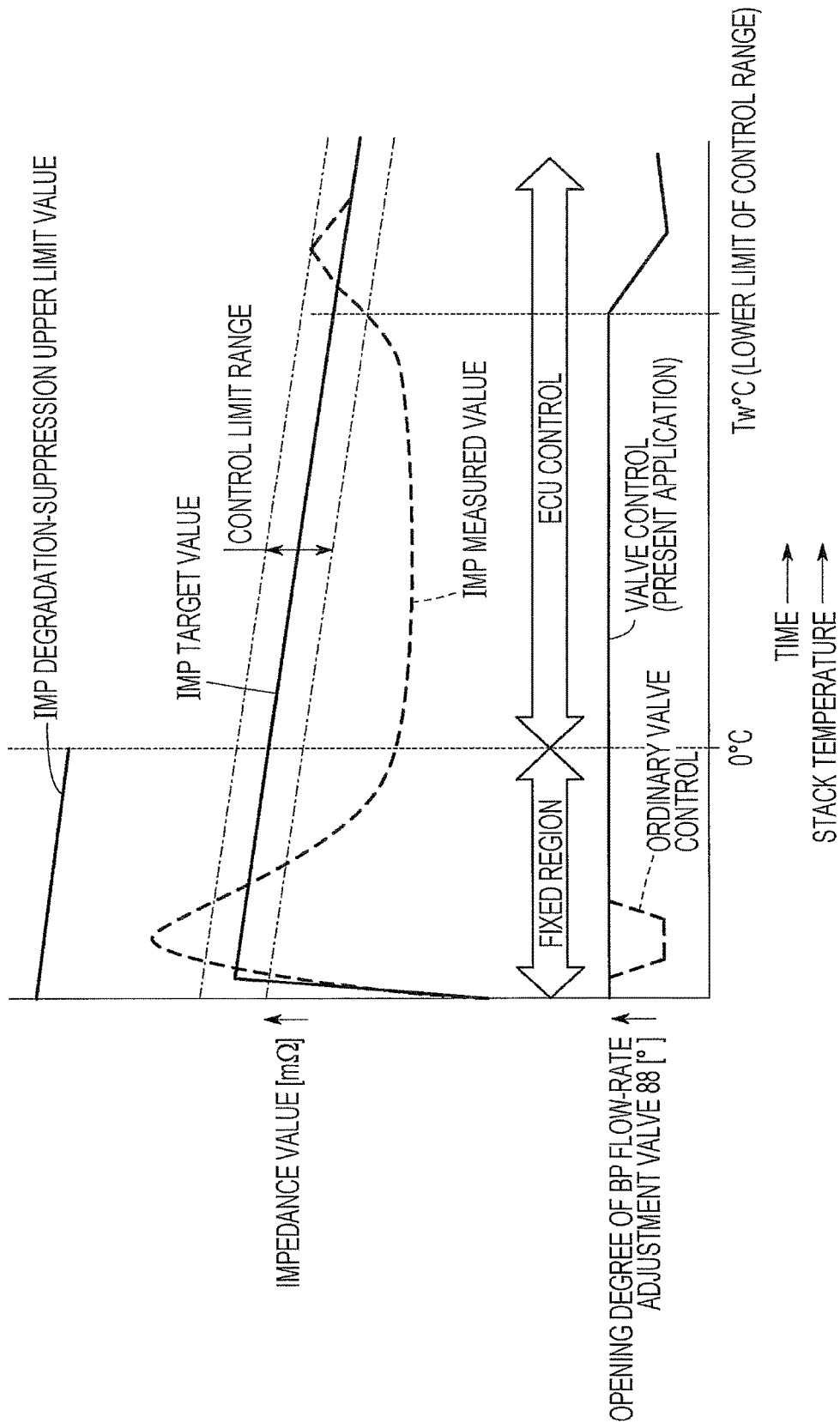
FIG. 2 is a time chart referenced to explain the low-temperature startup method.

Usually, when the impedance value exceeds an upper limit of the control range immediately after the low-temperature startup, the opening degree of the BP flow rate adjustment valve 88 is controlled to be changed depending on the increasing change of the impedance value in order to increase an degree of humidification of air (see ordinary valve control denoted by a dotted line in FIG. 2). However, at the low-temperature startup, the temperature in the electrode surface is still lower than 0° C. Accordingly, if the humidified air is supplied, dew condensation would be more apt to generate, and a high-humidity state would be maintained.

In view of the above point, in the embodiment, at the low-temperature startup lower than 0° C., the drying control is always executed by opening the BP flow rate adjustment valve 88 at a larger opening degree than that at the ordinary startup without taking into account the impedance value. This provides an advantageous effect that dew condensation of moisture can be suppressed at the low-temperature startup by simple control with reliability as high as possible and stability in power generation can be ensured satisfactorily.

Furthermore, in the embodiment, the drying control is continued until the temperature of the coolant flowing through the fuel cell stack 12 exceeds a predetermined temperature, more specifically until it is determined that the temperature in the electrode surface has exceeded 0° C. As a result, the stability in the power generation of the fuel cell stack 12 can be ensured effectively.

While, in the embodiment, the drying control is executed by adjusting the opening degree of the BP flow rate adjustment valve 88 and hence adjusting the degree of humidification of the air supplied to the fuel cell stack 12, the drying control is not limited to the foregoing manner. As another example, the number of rotations of the air pump 78 constituting the oxidant gas supply device 16, illustrated in FIG. 1, may be increased in comparison with that at the ordinary startup to increase the amount of the supplied air in comparison with that at the ordinary startup. Even with such a manner, the drying control can be executed for the interior of the fuel cell stack 12, and the stability in the power generation of the fuel cell stack 12 can be improved.

As an alternative, the drying control may be executed by reducing the number of rotations of the water pump 104, which constitutes the coolant supply device 18, in comparison with that at the ordinary startup, and hence reducing the amount of the supplied coolant in comparison with that at the ordinary startup. With that control, since a temperature difference can be generated between the temperature at the coolant inlet of the fuel cell stack 12 and the temperature at the coolant outlet thereof, it is possible to promote purge of steam and to produce a dry state with higher reliability.

In addition, it is required to ensure a minimum flow rate of the coolant in order to prevent a variation of the temperature in the electrode surface from increasing excessively. Moreover, the coolant may be supplied with an intermittent operation by switching over an on/off state per predetermined time.

A fuel cell system to which the low-temperature startup method according to the present application is applied includes a fuel cell, a fuel gas supply device that supplies fuel gas, an oxidant gas supply device that supplies oxidant gas, and a coolant supply device that supplies a coolant. The fuel cell generates electric power by electrochemical reaction between the fuel gas and the oxidant gas. The low-temperature startup method executes, at low-temperature startup, drying control to further promote drying for a predetermined time in comparison with control executed at ordinary startup.

In the low-temperature startup method described above, preferably, the drying control is continued until temperature of the coolant flowing through the fuel cell exceeds a predetermined temperature.

In the low-temperature startup method described above, preferably, the drying control is executed by reducing a flow rate of the coolant flowing through the fuel cell in comparison with a flow rate of the coolant flowing through the fuel cell at the ordinary startup.

In addition, preferably, the oxidant gas supply device includes a humidifier that humidifies the oxidant gas and supplies the humidified oxidant gas to the fuel cell, and a bypass flow passage through which the oxidant gas is supplied to the fuel cell in a bypassing relation to the humidifier. In that case, preferably, a bypass valve is disposed in the bypass flow passage to adjust a flow rate of the oxidant gas flowing through the bypass flow passage, and the drying control is executing by increasing an opening degree of the bypass valve.

According to the present application, at the low-temperature startup, the drying control to further promote drying in comparison with the control executed at the ordinary startup is executed for a predetermined time. Thus, the drying control is always executed at the low-temperature startup without taking into account an impedance value, for example. It is hence possible to suppress dew condensation of moisture at the low-temperature startup by simple control with reliability as high as possible, and to satisfactorily ensure stability in the power generation.

Obviously, numerous modifications and variations of the present invention are possible in light of the above teachings. It is therefore to be understood that within the scope of the appended claims, the invention may be practiced otherwise than as specifically described herein.

What is claimed is:

1. A low-temperature startup method for a fuel cell, comprising:
   detecting a temperature of the fuel cell;
   determining whether the temperature is lower than a threshold temperature;
   performing and increasing a drying operation to dry the fuel cell during a startup operation when the temperature is determined to be lower than the threshold temperature upon starting the fuel cell to generate electric power via an electrochemical reaction between fuel gas and oxidant gas;
   detecting a temperature of a coolant by a temperature sensor; and
   performing feedback control to monitor an impedance value of the fuel cell and the temperature of the coolant in order to prevent excessive drying of the fuel cell when the temperature is determined to exceed the threshold temperature.

2. The low-temperature startup method according to claim 1, wherein the drying operation is continued until the temperature of the coolant flowing through the fuel cell exceeds a predetermined temperature.

3. The low-temperature startup method according to claim 1, wherein the drying operation is executed by reducing a flow rate of the coolant flowing through the fuel cell in comparison with a flow rate of the coolant flowing through the fuel cell at an ordinary startup.

4. The low-temperature startup method according to claim 1, wherein an oxidant gas supply device which supplies the oxidant gas to the fuel cell includes a humidifier that humidifies the oxidant gas and supplies the humidified oxidant gas to the fuel cell, and a bypass flow passage through which the oxidant gas is supplied to the fuel cell in a bypassing relation to the humidifier,
   a bypass valve is disposed in the bypass flow passage to adjust a flow rate of the oxidant gas flowing through the bypass flow passage, and the drying operation is executing by increasing an opening degree of the bypass valve.

5. The low-temperature startup method according to claim 1, wherein the threshold temperature is 0° C.

* * * * *